United States Patent [19]
Voytilla et al.

[11] Patent Number: 4,846,031
[45] Date of Patent: Jul. 11, 1989

[54] METHOD AND APPARATUS FOR BLANKING MOLDED PARTS

[75] Inventors: Joseph M. Voytilla; Mikel Smithson, both of Pottstown, Pa.

[73] Assignee: JL Tool and Machine Co., Pottstown, Pa.

[21] Appl. No.: 117,016

[22] Filed: Nov. 4, 1987

[51] Int. Cl.$^4$ .............................. B26F 1/40; B26D 5/26
[52] U.S. Cl. ............................................. 83/50; 83/267
[58] Field of Search ............... 83/267, 411 R, 50, 231, 83/276, 413, 733

[56] References Cited

U.S. PATENT DOCUMENTS

| | | | |
|---|---|---|---|
| 806,362 | 12/1905 | Porter et al. | 83/267 |
| 1,775,026 | 9/1930 | Hamwi | 83/267 X |

*Primary Examiner*—Donald R. Schran
*Attorney, Agent, or Firm*—Eugene E. Renz, Jr.

[57] ABSTRACT

A method of blanking articles or products molded in a unitary sheet and arranged in a predetermined configuration or array consisting of the steps of configuration or array comprising a plurality of identical symmetrical segments consisting of the steps of first blanking the articles in a first segment of the sheet, rotating the sheet to present the next adjacent segment to the blanking dies, blanking the articles in the next successive segment and repeating the indexing and blanking until all of the articles in all of the segments have been removed from the sheet.

Apparatus for blanking articles or products molded in a unitary sheet and arranged in a particular configuration or array including a plurality of segments of an identical configuration comprising cooperating male and female blanking dies of an array and configuration corresponding to the array and configuration of the articles in one segment of the sheet; a support for the sheet consisting of an annular ring member and a cover having a series of openings arranged in a pattern and array corresponding to the pattern and array of the articles of the molded sheet and means for sequentially positioning the articles in each of a plurality of segments of the sheet sequentially to thereby blank the articles from each segment sequentially.

10 Claims, 6 Drawing Sheets

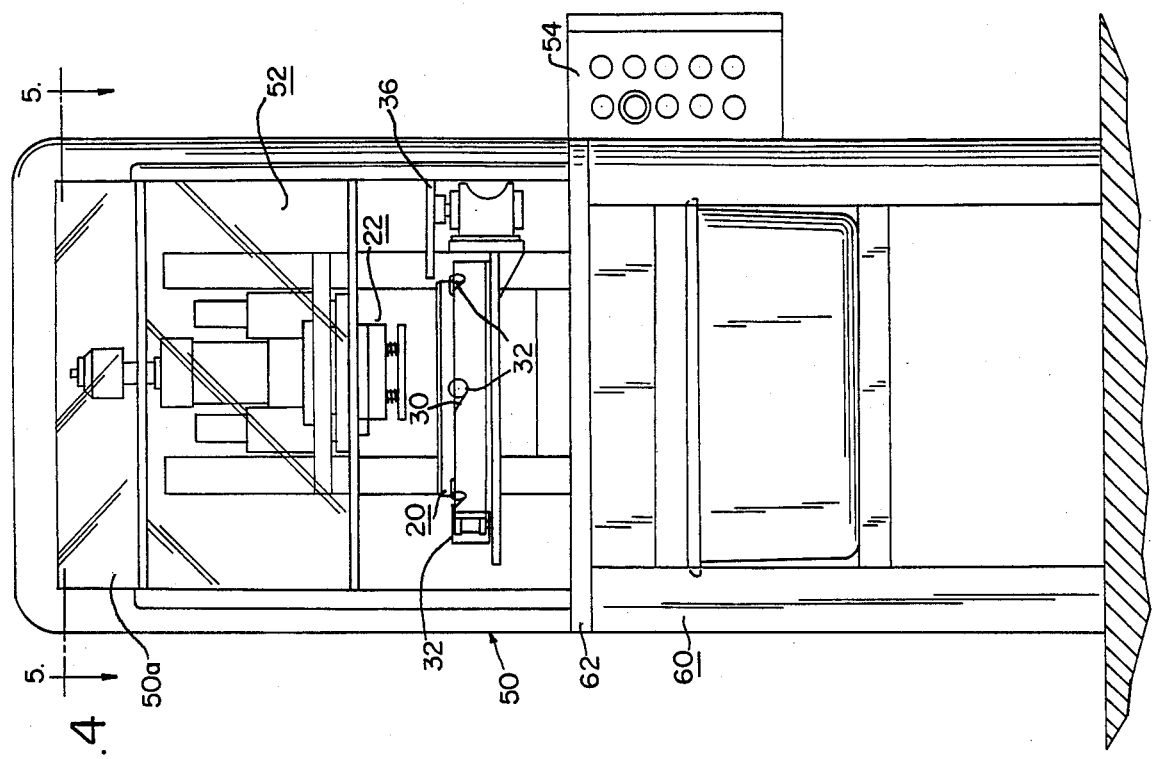
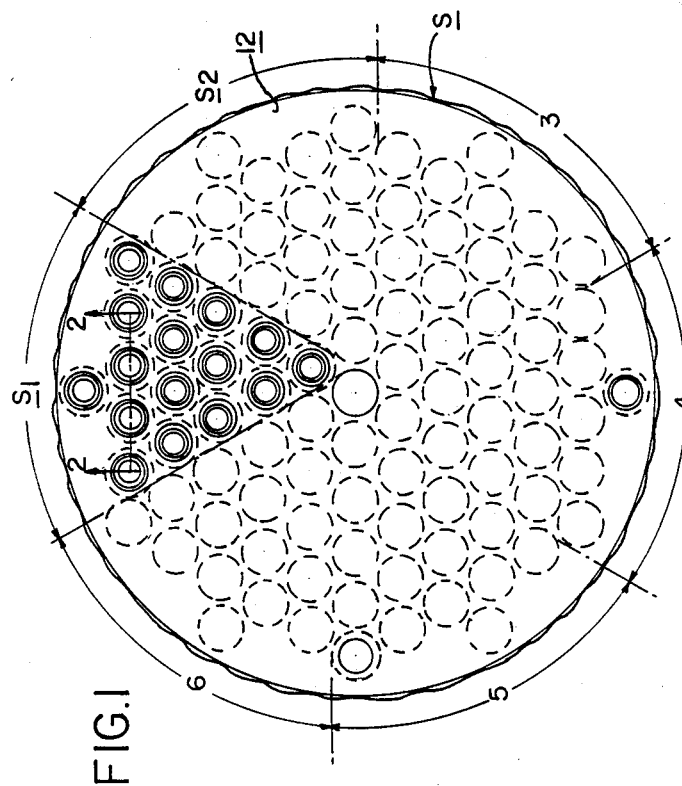
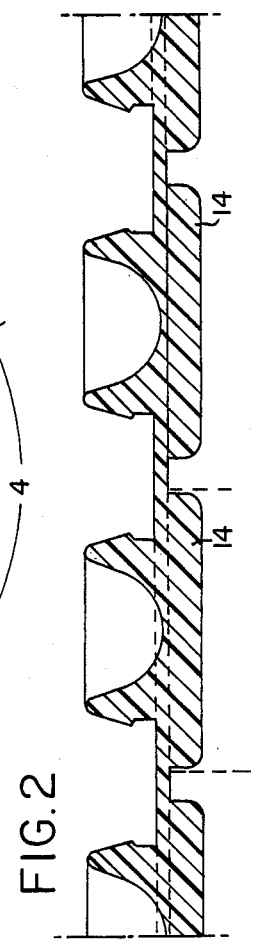
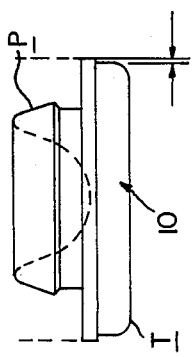

METHOD AND APPARATUS FOR BLANKING MOLDED PARTS

FIELD OF THE INVENTION

The present invention relates to method and apparatus for trimming molded products such as stoppers for pharmaceutical vials or the like wherein a plurality are cast on a single unitary sheet.

BACKGROUND OF THE INVENTION

Many products made from a resilient material such as rubber are molded by a conventional process which results in a plurality of the parts being connected in a single, unitary, integral sheet form. The parts are then blanked from the sheet. Typical of parts manufactured in this fashion are stoppers for pharmaceutical vials which are generally of the type shown, for example in FIG. 3, and have a generally disk-like top T and a plug P depending therefrom which engages in the discharge opening in a vial or bottle for a pharmaceutical product. The plug is of a contoured configuration as shown so that the top can be pierced by a hypodermic syringe to withdraw contents of the container. These molded sheets are usually of a rectangular or square pattern and presently are blanked in their entirety in a trim press of the type shown, for example, in U.S. Pat. No. 4,161,140. The orientation of the parts or products in the rectangular or square pattern sheets is usually aligned rows or slightly staggered offset aligned rows. While these prior trim presses are generally effective for the purposes intended, nevertheless they have certain disadvantages and drawbacks. In conventional presses of this type, the entire sheet is blanked in one cycle of operation. Consequently, the dies for this press are rather large and thus, add considerably to the expense of the system. Moreover, the power requirements for actuating large die elements is considerably great. It has also been found that in blanking or trimming operations utilizing large dies, it is difficult to obtain the precision and preciseness in trimming all of the parts from the sheet material. Furthermore, these presses are comparatively large and, therefore, rather expensive, particularly for relatively small volume operations where the capacity of the press is not utilized fully.

By reason of the cost of comparatively large die tooling for processing small volume components, it has been found that in small volume operations the punching or trimming is usually done by hand operated mechanisms. This, of course, impacts manual trimming reduces productivity considerably thereby adding to the cost of these products themselves.

SUMMARY OF THE INVENTION

With the foregoing in mind, it is an object of the present invention to provide a new and improved method and apparatus for trimming molded products which is of comparatively simplified construction and which overcomes the disadvantages and drawbacks of prior trimming systems and apparatus described above. The blanking and trimming system and apparatus of the present invention are particularly suited for blanking products or parts cast on a unitary sheet having a predetermined geometric shape wherein the articles on the sheet have a repeat geometric pattern, for example a triangular pattern as illustrated in FIG. 1 of the drawings. In accordance with the blanking and trimming system of the present invention, the sheet is supported in a predetermined precisely aligned position relative to a blanking mechanism including a blanking die of a triangular configuration which operates during one cycle to blank one triangular segment of the sheet. Thereafter, the sheet is sequentially indexed to precisely align it for the next blanking and trimming operation so that the entire sheet is fully blanked in sequential steps and wherein triangular segments of the sheet are removed in each cycle of operation. It has been found that this arrangement produces more precise blanking and trimming of the articles in the entire sheet. Furthermore, the entire apparatus is considerably smaller and, therefore, more economical to manufacture and assemble. Additionally, the blanking forces required are considerably less by reason of the relatively small segmental nature of the blanking operation. The present invention provides an economic advantage and solution to the disadvantages and drawbacks of hand punching or trimming operations in that it increases productivity considerably and is clearly more safe from an operators standpoint than the hand punching techniques which often present the hazard of injury to the operator.

BRIEF DESCRIPTION OF THE DRAWINGS

These and other objects of the present invention and the various features and details of the operation and construction thereof are hereinafter more fully set forth with reference to the accompanying drawings, wherein:

FIG. 1 is a plan view of a circularly molded sheet of rubber having a plurality of geometrically spaced stoppers molded therein interconnected in a single, unitary sheet, the individual stoppers being blanked from the sheet, in accordance with the apparatus and method of the present invention;

FIG. 2 is an enlarged fragmentary sectional view, taken on the line 2—2 of FIG. 1 showing plurality of interconnected stoppers to be blanked from the disk;

FIG. 3 is an enlarged view of an individual stopper after the blanking operation;

FIG. 4 is a front elevational view of apparatus for blanking molded parts in accordance with the present invention;

DETAILED DESCRIPTION OF THE PREFERRED EMBODIMENT

Figure 1A:
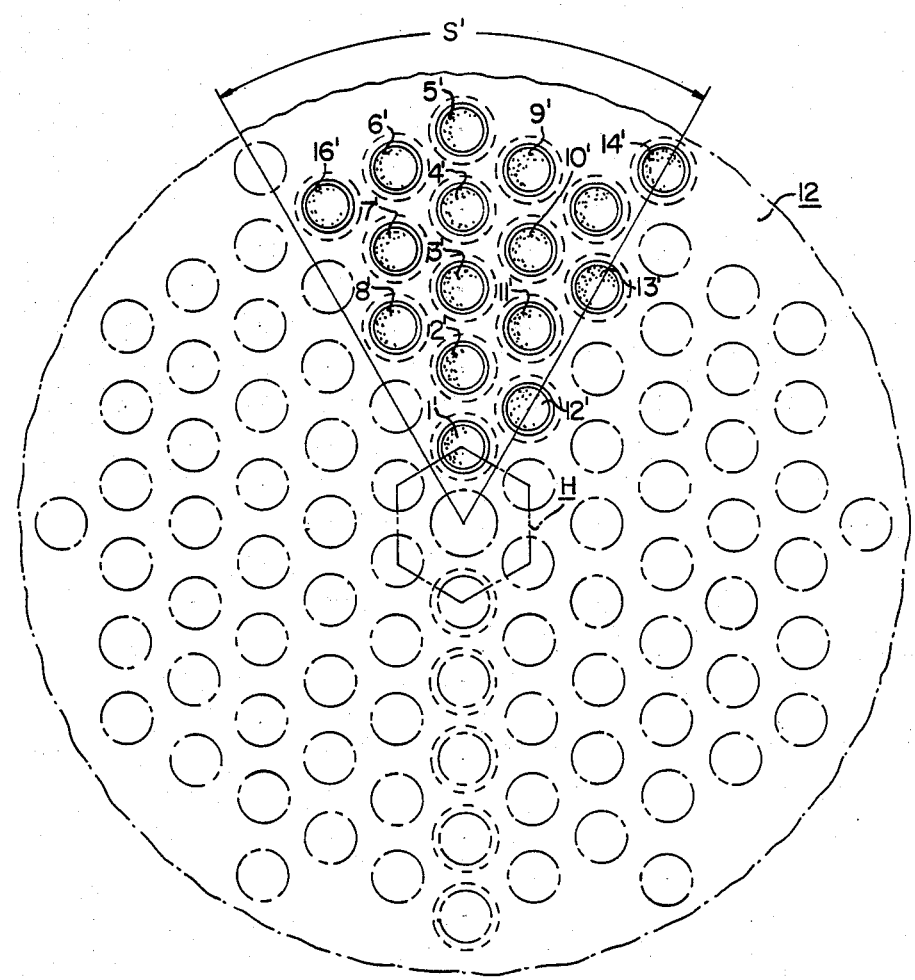
FIG. 1a is a fragmentary view showing an alternate trim pattern.
Figure 5:
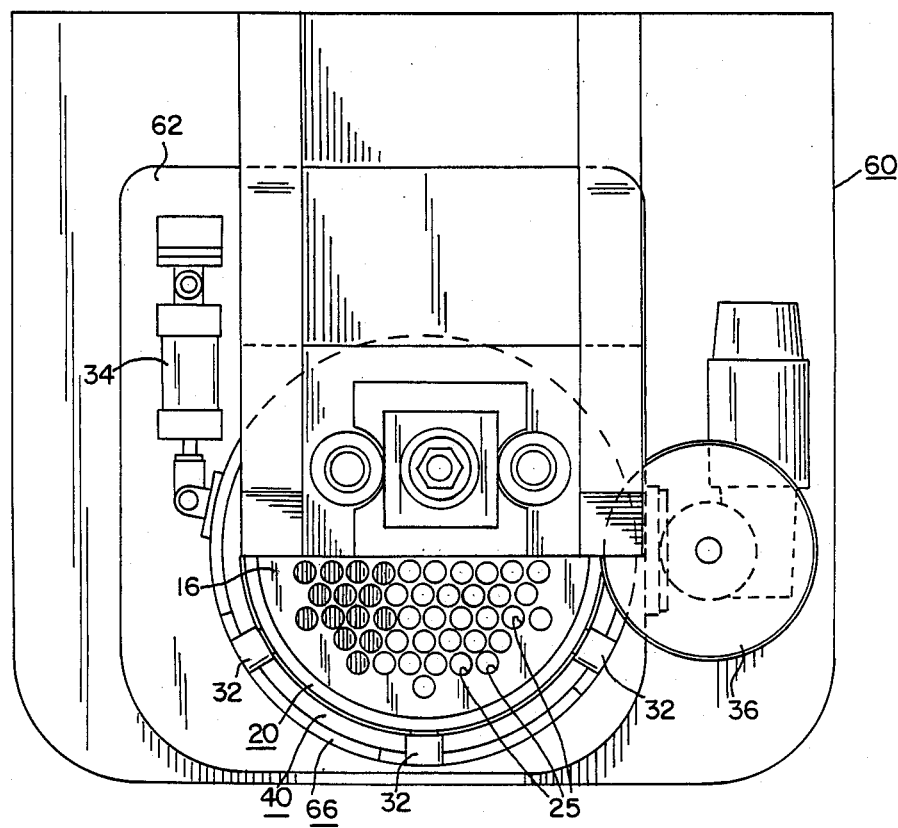
FIG. 5 is an enlarged plan view taken on the line 5—5 of FIG. 4, with the safety window enclosure of the apparatus removed for clarity to show certain internal details of construction.
Figure 6:
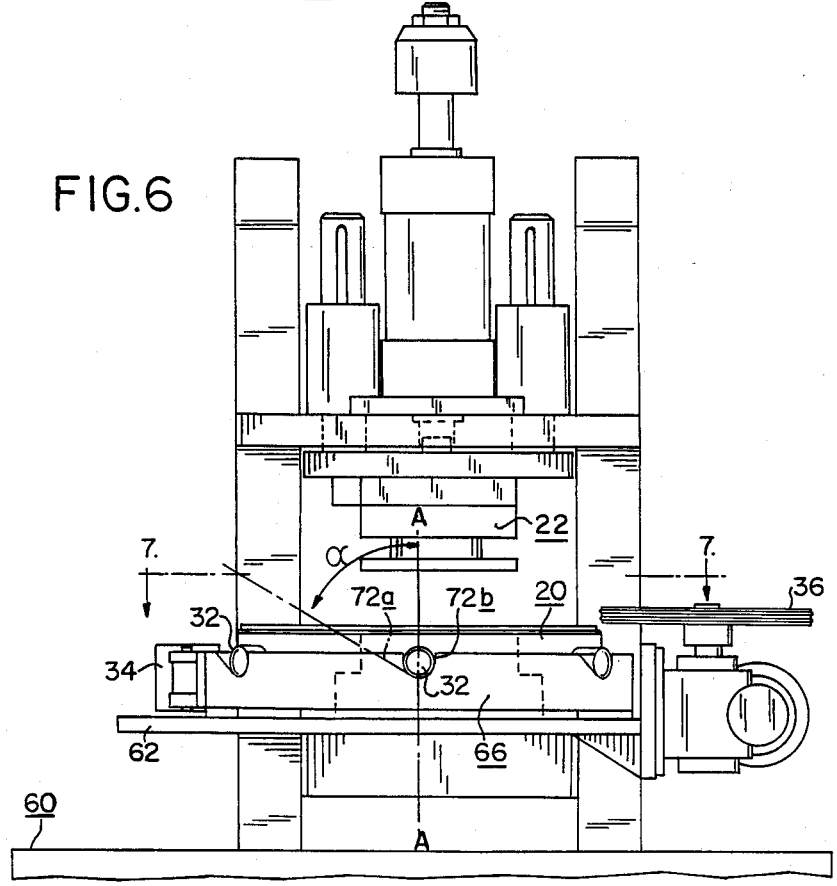
FIG. 6 is a front elevational view of the apparatus shown in FIG. 5.
Figure 7:
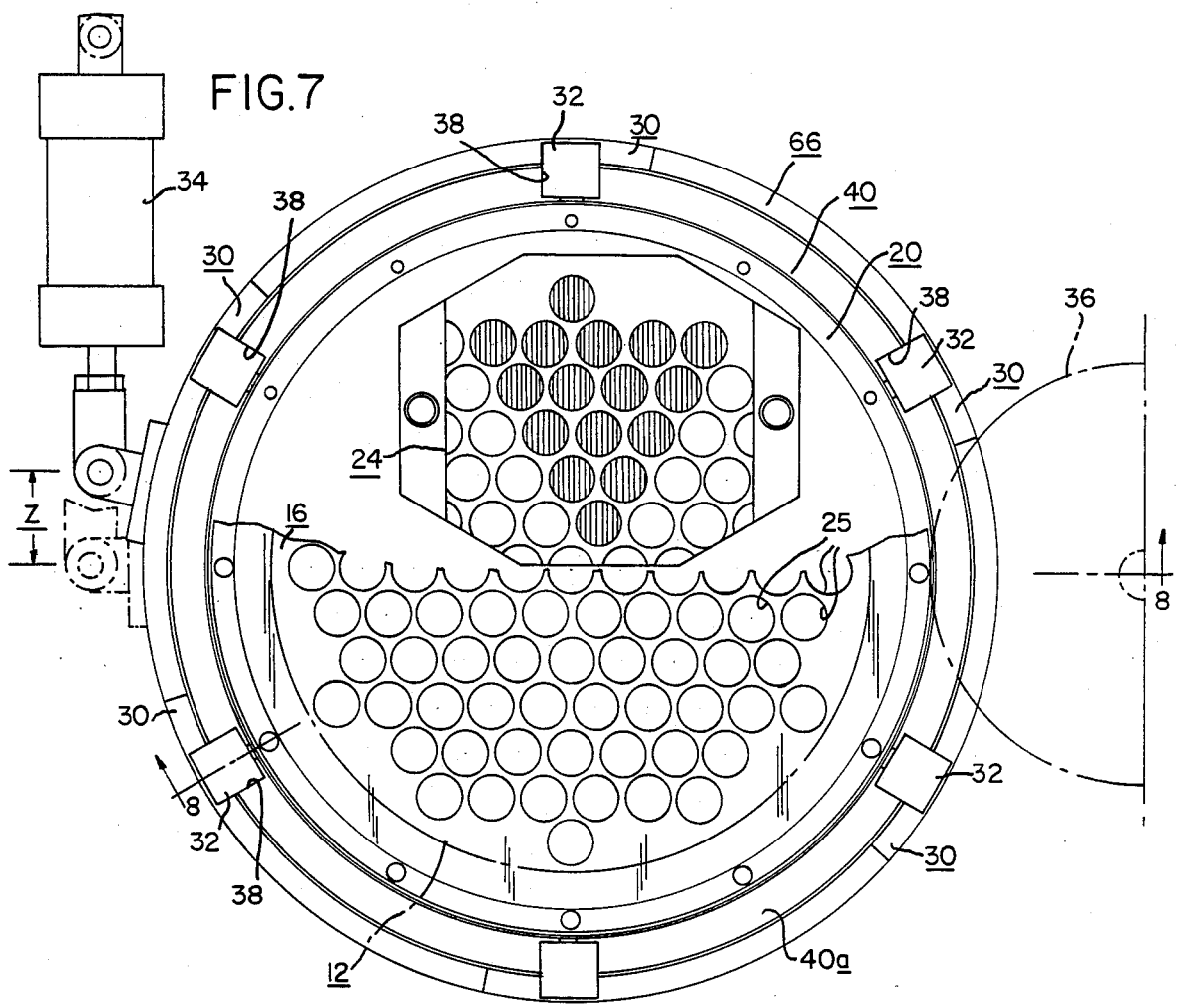
FIG. 7 is an enlarged fragmentary sectional plan view taken on the line 7—7 of FIG. 6 illustrating additional details of construction.
Figure 8:
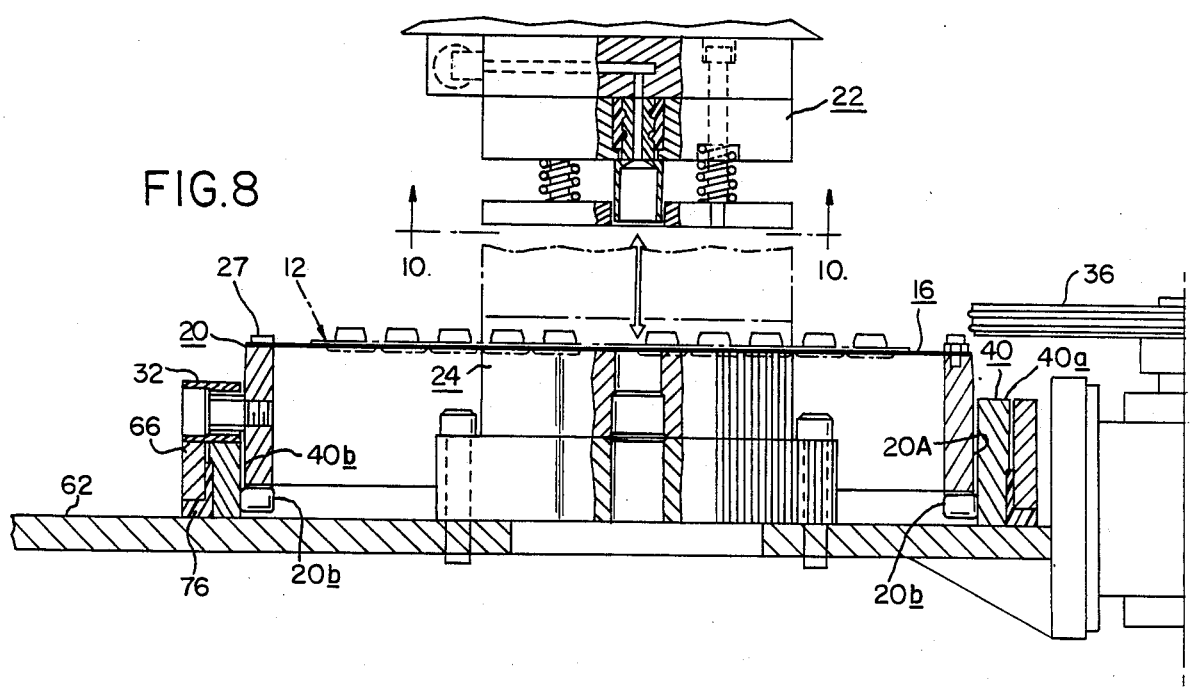
FIG. 8 is a sectional view taken on the line 8—8 of FIG. 7 showing additional details of construction.
Figure 9:
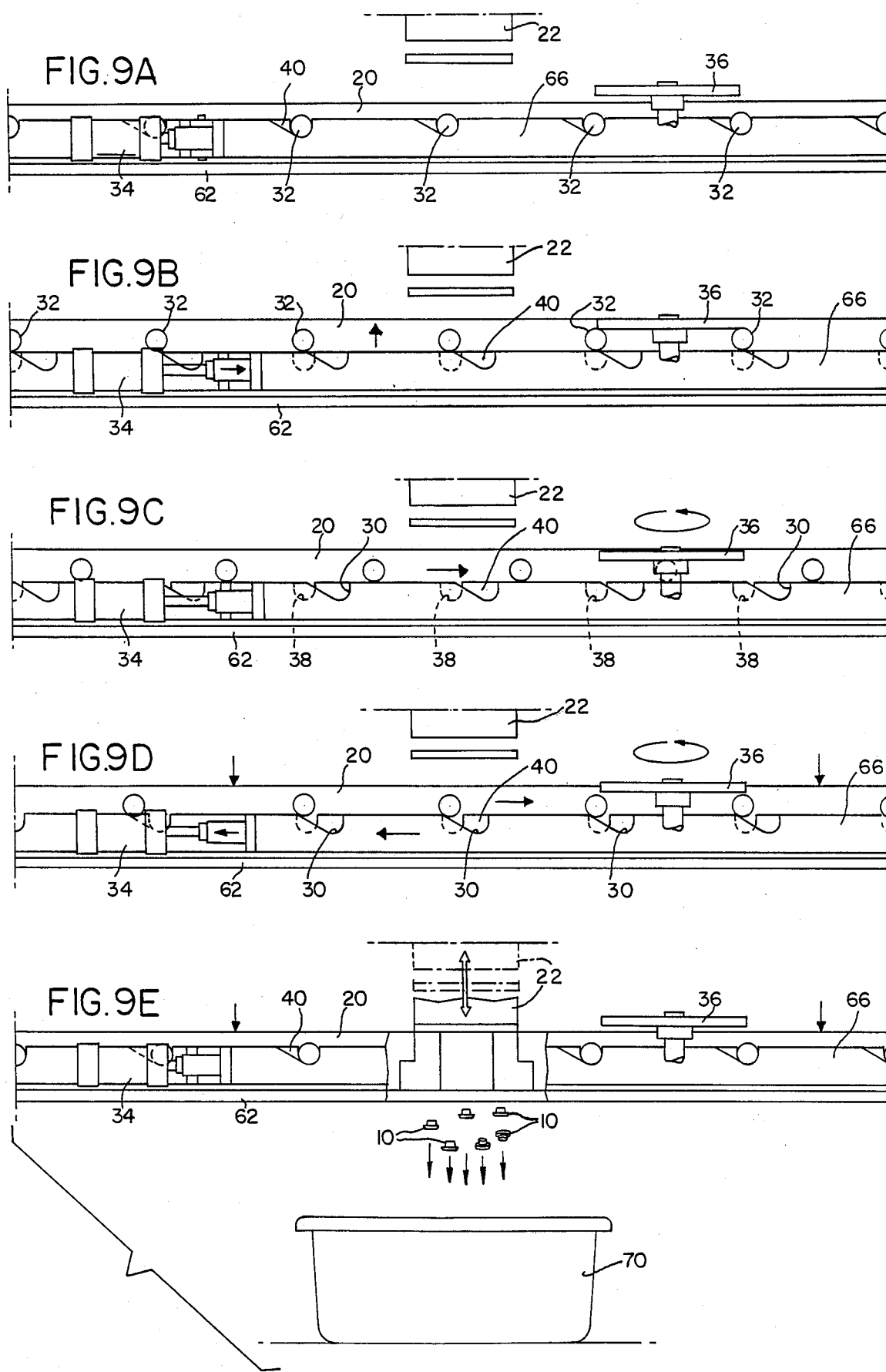
FIG. 9A–9E are semi-schematic development views illustrating the sequential steps performed by the apparatus of the present invention including indexing and blanking individual stoppers from a pre-molded disk.
Figure 10:
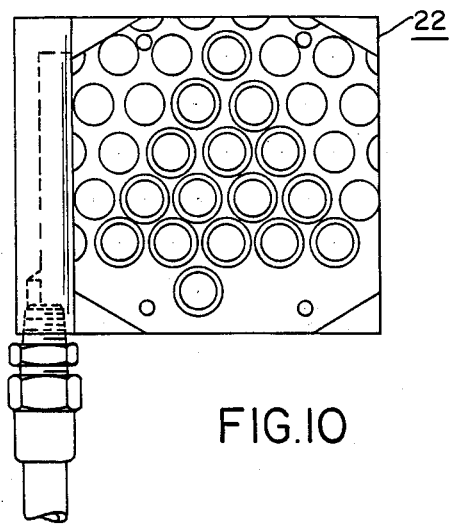
FIG. 10 is a bottom plan view taken on the line 10—10 of FIG. 8 showing details of the male punch assembly.
Figure 11:
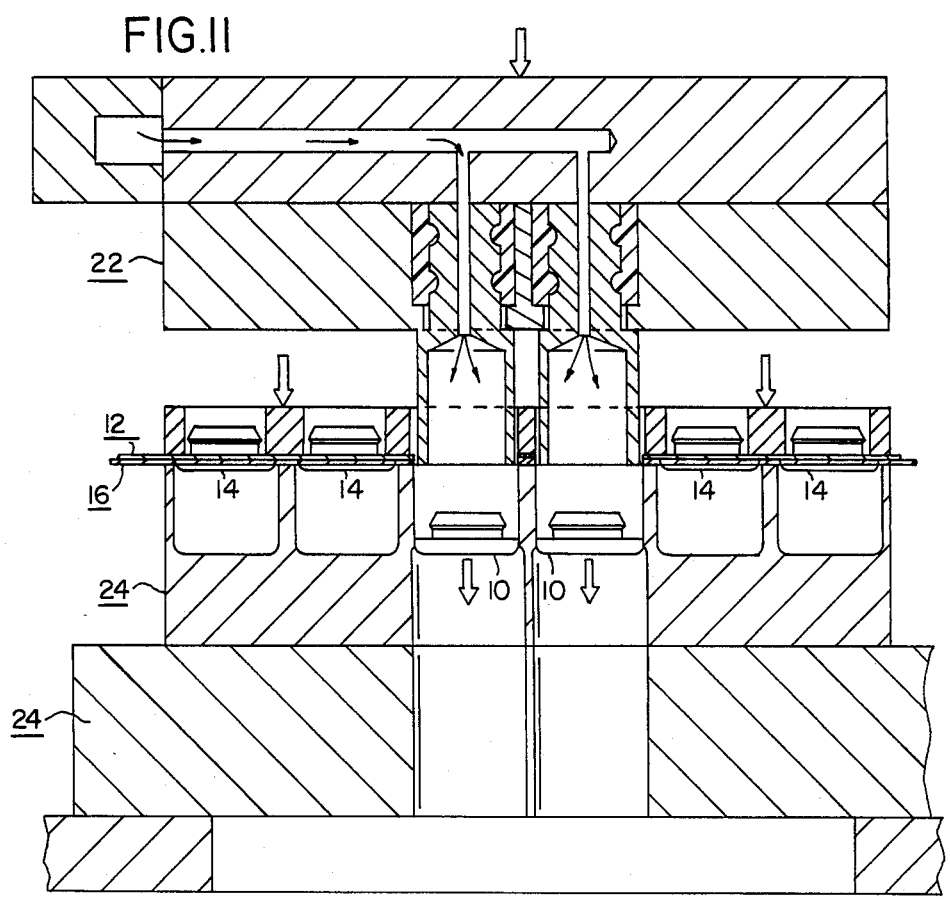
FIG. 11 is a greatly enlarged fragmentary sectional view showing details of construction of the male and female components of a blanking disk and the relative position of their respective parts during the blanking operation.

The blanking apparatus and method of the present invention are suited for blanking a variety of molded products or articles. The apparatus described hereafter and shown in the drawings is adapted for blanking and trimming stopper type closures of the type illustrated in FIG. 3 and generally referenced by the numeral 10 which are molded in the circular array shown in FIG. 1 wherein the stoppers in the disk-like sheet 12 are connected by a thin web 13 which connects the stoppers at the head portion 14. It is, of course, to be understood that the concept of the present invention apples to other types of molded articles. In accordance with the present invention, the products in the present instance stoppers are arranged in a hexagon pattern to facilitate the segmental trimming operation described hereinafter. More specifically and with reference to FIG. 1, starting at the center of the sheet 12 the surrounding products all have a center that lies on a corner of a hexagon as shown by the solid line and designated H.

The blanking method of the present invention broadly consists of supporting a sheet 12 of the type described above in a predetermined precisely aligned position relative to a blanking mechanism operable during one cycle of operation to blank the articles or stoppers in one segment or sector of the sheet and thereafter sequentially indexing the sheet to precisely align it in each indexing operation with the blanking dies to effect sequential removal of the articles in each segment of the entire sheet. The blanking die in the present instance is designed to remove a repeatable segment or pattern in the cast sheet. In the illustrated embodiment, the repeatable segment $S_1$ comprises a triangular cluster of the articles or stoppers.

Even though the segment or sector S1 is shown in the drawings as a generally triangular cluster of particles or stoppers, it is to be understood that the novel features of the present invention have application to other geometric arrays of articles and that the term segment or sector are not limited to the triangular cluster shown herein.

Considering the system of the present invention broadly and with reference to the basic elements of the apparatus for blanking molded articles in accordance with the present invention, a sheet 12 of molded articles 10 in the pattern and array shown in FIG. 1 is placed with the stoppers facing downwardly on a thin flexible cover 16 of a rotatable, floating inner ring 20. A male die 22 of a pie shaped configuration having a cutting pattern to complement the stoppers in a segment S of the sheet is then cycled to blank out the stoppers lying in the first pie shape segment for example, marked S in FIG. 1. During one cycle of the die 22 the stoppers 10 in the segment $S_1$ of the sheets are blanked. The sheet supporting ring 20 is then rotated through a predetermined angular displacement by novel actuating and indexing mechanism in accordance with the present invention to present the next most adjacent triangular segment $S_2$ of the sheet 12 to align with the male and female dies 22 and 24 for blanking the next adjacent segment $S_2$. The specific structural details and arrangement of the actuating and indexing mechanism will be described in more detail below. The mechanism broadly comprises cam and cam follower means 30 and 32, respectively, and a double acting actuating mechanism 34 which functions to actuate the sheet supporting ring 20 vertically to a position where it engages a continuously rotating drive means 36 operable to rotate the inner ring 20 relative to a fixed annular member 40 which has a plurality of circumferentially equispaced U-shaped notches 38 defining indexing seats. The drive means 36 frictionally engages the inner ring 20 to provide a sufficient contact to rotate the ring and release the same when the inner ring cam means 32 registers with the next adjacent U-shaped indexing seat 38. This provides a simple and quick means for intermittently rotating the sheet supporting ring 20 to effect the blanking operation described above. This general sequence of operations is best illustrated in FIGS. 9A-9E inclusive. As illustrated therein, that the stoppers 10 blanked from the sheet 12 fall into an accumulator bin 40 disposed below the co-acting dies. If desired conveyor means may be used to continuously transport blanked stoppers from the discharge station. Suitable conventional electrical controls may be provided for affecting the sequence of operation described above in a continuous fashion.

Considering the apparatus in more specific detail and with particular reference to FIG. 4, the apparatus comprises an upstanding housing 50 having an enclosed upper portion 50a which houses the blanking mechanisms. A sliding window 52 provides access to the working parts of the mechanism which for safety reasons must be closed to initiate operation of the indexing and blanking mechanisms. A control panel 54 for the electronics to operate the apparatus is mounted on one side of the housing 50.

The details of the blanking and indexing mechanisms are best illustrated in FIGS. 5–8 inclusive and as illustrated therein comprises an upstanding generally elongated frame 60 having a horizontally extending table support surface 62. The indexing mechanism comprises a series of concentric annular ring members adapted for relative rotational movement to sequentially rotate the sheet 12 during the blanking operation in generally the manner described above. In the present instance, the ring members are concentric and comprise the floating inner ring 20, an intermediate fixed ring 40 mounted to the table support 62 and an outer drive or actuating ring 66. The ring 40 has a series of circumferentially equispaced U-shaped cam slots 38 formed in its upper edge. The actuating ring 66 has a series of equi-spaced, circumferentially extending cam slots 72 of a predetermined configuration including an inclined ramp 72a disposed at a predetermined angle $\alpha$ to the axis $A \leqq A$ of the rings (see FIG. 6) and a vertical abutment wall 72b aligned with the axis A—A. The inner floating ring member 20 has an outer peripheral surface 26A having an diameter slightly less than the inner peripheral surface of the fixed intermediate ring 40 and mounts a plurality of cam followers 32 in the form of sleeve rollers which project radially from the sidewall of the inner ring 20 in the manner shown in FIGS. 7 & 8. The rollers 32 ride on the upper edge 40a of the fixed ring 40. The actuator ring 66 circumscribes the fixed ring 40 and rides on a bearing sleeve 76 made out of a low friction material. The actuating sleeve 66 is adapted for limited rotational movement relative to the fixed ring 40 by means of a piston cylinder actuator 34 which reciprocates and has a stroke of a predetermined length L to rotate the actuating ring 66 angularly a relatively small angle of about 11.2° sufficient to move the cam rollers up the inclined cam surface to a position to ride on the upper edge of the fixed ring 40 (the position shown in FIG. 9B) which raises the floating ring 20 to a sufficient height to make frictional contact with the continuously rotating drive wheel 36 which affects rotation of the floating ring 20 a predetermined angular increment. During rotation of the ring 20 by the drive roller 36, the sleeve cams 32 ride on the upper edge 40a of the fixed ring 40 until the rollers are again positioned in alignment with the next U-shaped indexing slots 38. The outer actuator ring 66 returns to its home position which precisely aligns the floating ring 20 and the sheets supported thereon for blanking the next segment of the sheet 12 in a manner described in more detail below. The sleeves 32 have a precise fit in the U-shaped indexing slots 38 to ensure accurate alignment of each segment of the sheet relative to the male and female dies for a precise and proper blanking operation. When the cam sleeves 32 are aligned with the notches 38, the floating ring 20 drops downwardly to disengage the drive roller 36. The return stroke of the actuator 34 is timed in relation to the angular speed of rotation of the friction drive roller 36 so that as the cam rollers 32 approach the next indexing position, the rollers 32 reengage the cam following ramps $72^a$ to ease the rollers into the slot thus preventing free fall. This feature adds to the long life and precision of the mechanism.

Consider now operation of the apparatus and system of the present invention. Assume that sheets 12 of the type shown in FIG. 1 are going to be processed in the apparatus and that the male and female dies are of a design and configuration to blank segments S as represented in each of the six segments shown in FIG. 1. In this instance, the MYLAR cover 16 for the floating ring has a plurality of openings 25 therein conforming to the stopper pattern of the sheet 12. The perforated cover is supported on the upper edge of the floating ring 40 by an annular collar 27 holding the MYLAR cover in place by a series of circumferentially spaced screws. It is, of course, to be understood that the dies are easily replaceable, so that the apparatus and system of the present invention are adapted to blank molded products of a different shape and configuration than that illustrated herein and in a different molded array or pattern.

The housing has a side access panel which can be removed when it is desired or necessary to change die parts or the like. In these cases, of course, the machine is shut down and there is no danger of injury to the user. In normal operations, there is a safety inner lock so that the mechanisms can only cycle or function when the window 52 is in a lowered position. When the window is raised for example to feed sheet product for trimming, the mechanisms are locked from cycling and therefore protect an operator from injury. The inner lock in the present instance shuts the entire machine down electrically, as well as, hydraulically.

The apparatus is now ready for use. A sheet 12 of pre-molded parts is then simply placed on the MYLAR cover so that the generally disk-like top portions engage in the openings whereby the sheet is precisely aligned with respect to the male and female dies to blank the stoppers. The start button is actuated to close window 52 which then initiates the indexing and blanking operations. The male die is then cycled to blank the stoppers in the first segment S1 of the molded sheet. When the male die returns to a retracted position (shown in sold lines in FIG. 8), the piston cylinder actuator 34 is operated through one cycle which in the present instance rotates the actuator ring 66 in a counterclockwise direction and then simply reverses it to return the actuator ring 66 to its home position. During cycling of the actuator ring 66 through this cycle, the cam sleeves ride up the inclined ramp of the cam slot to a point where the cam rollers ride on the top edge of the fixed ring 40 as best illustrated in the sequential FIGS. 9B and 9C. During this cycle, the floating ring 20 is raised vertically to a point where the slightly beveled outer surface contacts the drive roller 36 which then rotates the floating ring 20 in a counterclockwise direction with respect to FIG. 7 until the sleeves realign and engage in the U-shaped indexing slots in the fixed ring 40. In this position, the floating ring drops vertically and locks in place and disengages the drive ring 36. This rotation positions the sheet 12 so that the second segment $S_2$ is in proper alignment for the next blanking operation. The floating ring 20 mounts a plurality of circumferentially equi-spaced rollers on the lower edge $20^a$ which engage the inner peripheral wall $40^b$ of the fixed ring 40 to insure precise concentricity of the rings relative to one another at all angular positions and thereby insure precise orientation of the openings in the MYLAR sheet in reference to the dies. This in turn produces precision trimming of all parts in the sheet 12.

The above sequence of operation continues until the entire sheet has been blanked and only "flash" remains. Flash V is the web remaining after parts have been trimmed. At that point, the window 52 raises automatically and the operator removes the flash and positions a new sheet on the floating indexing MYLAR cover 16. As noted above, there is an interlock preventing operation of any of the mechanisms during the time the operator is manipulating the flash and new sheet to eliminate the risk of injury.

The configuration and arrangement of the indexing apparatus provides for precise alignment of the sheet 12 relative to the dies so that each of the pieces blanked from the sheet is the same and any tolerances between spacing for individual articles in the sheet is compensated for. To this end, in accordance with the present invention, this is achieved by use of a flexible cover sheet 16, cover member or element which is initially blanked by the male and female dies 22 and 24 at the start of an operation for blanking a particular pattern and in this way, the orientation and arrangement of the openings 25 in the cover sheet are precisely the same as the spacing of all of the molded articles relative to one another in the unblanked sheet. Thus, the MYLAR cover sheet 16 with the openings for registering the disk or sheet 12 of integrated stoppers 10 is made simply by securing an unblanked sheet of MYLAR film to the upper circumferentially extending edge of the floating ring 20 and cycling the apparatus through the above described sequences to blank the entire sheet 12. Another interesting feature of the present invention is the fact that in the pattern of integrally molded stoppers 10 on the sheet, the true radial centerline of the preshaped segments is offset with respect to the centerline of the disk by approximately one-half the diameter of a stopper 10 and is, as illustrated, to the right of the vertical centerline of the disk-like sheet 12. This arrangement ensures that all of the stoppers 10 included in the pre-molded rubber sheet are blanked from the sheet 12 in the present instance in six consecutive steps. When preparing the sheet 12 for blanking, it is preferably pre-soaked and placed on the cover sheet top down so that the centerline will coincide with the centerline of the floating rotating ring of the apparatus. The male and female dies 22 and 24, however, are offset from the centerline of rotation approximately one-half the diameter of a stopper 10.

The orientation and operation of the concentric rings coupled with the flexible mounting of the sheet during the blanking operation ensures precise alignment during each cycle of operation over an extended period of time. More specifically, there are no large torque or other forces during the sequential indexing of the floating ring 20 in the manner described above. The sleeves 32 have a precise conforming fit with the U-shaped indexing seats 38 of pockets and it is only the weight of the floating ring 20.

The motion of double acting actuating ram connected to the outer cam track ring which effects operation of the floating ring 20 in the manner described above serves three functions. First, it raises the cam followers out of the U-shaped notches 38 of the fixed intermediate ring 40 freeing the rubber disk carrying the inner floating ring 20 for rotation. Secondly, it provides a bridge over the U-shaped indexing seats of the fixed intermediate ring and lastly, it positions the slightly tapered upper side walls of the floating inner ring 20 into frictional engagement with the constantly rotating drive disk.

Even though particular embodiments of the invention have been illustrated and described herein, it is not intended to limit the invention and changes and modifications may be made therein within the scope of the following claims. For example, FIG. 1a shows an alternate trim pattern. In this instance, the pattern passes through the center of the circular sheet. In accordance with this alternate pattern the ram centerline can be placed more precisely in the center of the geometric pattern shown to increase the precision in so far as force concentration is a factor.

What is claimed is:

1. A method of blanking articles or products molded in a sheet and arranged in a predetermined configuration or array comprising a plurality of segments consisting of the steps of supporting the sheet on a sheet support means, blanking a first segment of the sheet in a sheet blanking mode wherein the sheet support is located in a predetermined first plane, indexing the sheet support means to present the next adjacent segment of the sheet to cooperating blanking dies by raising the sheet support means to a second plane, indexing the sheet support means by rotating the sheet support in the second plane until the next segment to be blanked is aligned with the blanking dies and the sheet support means drops by gravity to the first plane, and repeating the indexing and blanking until all the articles have been removed from the sheet.

2. A method as claimed in claim 1 including the steps of securing an unblanked flexible film to the sheet support means and repeating the indexing and blanking cycles to form openings in the sheet of an orientation and arrangement identical to the molded articles in the unblanked sheet.

3. In apparatus for blanking articles or products molded in a unitary sheet and arranged in a particular configuration or array including a plurality of segments of an identical configuration and including cooperating male and female blanking dies defining a blanking station of an array and configuration corresponding to the array and configuration of the articles in one segment of the sheet, a support means for the sheet including a first annular ring member and a cover having a series of openings arranged in a pattern and array corresponding to the pattern and array of the articles of the molded sheet, and actuating means for effecting controlled movement of said ring member circumferentially and axially to sequentially position the articles in each of a plurality of segments of the sheet at the blanking station to thereby blank the articles from each segment sequentially.

4. In apparatus as claimed in claim 3, including a fixed intermediate ring member circumscribing said first annular ring member and a third actuating ring member adapted for limited rotation relative to said fixed ring member and cam, and cam follower means operatively connecting said ring member to position the sheet support member in a first position relative to the blanking dies during a blanking operation and a second raised position to affect movement of the sheet support means to the next indexing position during an indexing cycle.

5. In apparatus as claimed in claim 4, wherein said actuating ring member has a series of equi-spaced circumferentially extending cam surfaces including an inclined ramp and a vertical abutment wall generally aligned with the axis of the ring members and a series of circumferentially spaced cam followers connected to said first ring member.

6. In apparatus as claimed in claim 5, including a plurality of circumferentially spaced generally U-shaped indexing slots extending downwardly from the top edge of the fixed ring, and including actuating means for reciprocating the outer ring relative to the fixed ring in a predetermined timed sequence to effect elevation of the first ring member upwardly to a raised position so the cam followers engage and ride on the top edge of the fixed ring between the indexing slots and wherein rotation of the first ring and the reciprocating movement of the outer ring are timed so that as the cam followers approach the next indexing slot, they re-engage the inclined ramp and are eased downwardly into the next indexing slot.

7. In apparatus as claimed in claim 4, wherein said sheet supporting means comprises a flexible disk-like film member having a series of openings formed therein to receive and seat the molded sheet in position for accurate blanking of the articles thereon.

8. In apparatus as claimed in claim 3, wherein said actuating and indexing means includes a member having a plurality of circumferentially spaced indexing seats and wherein said first annular ring member includes elements which engage in said seats and means for effecting sequential rotation of said first annular ring member and engagement in said indexing seats.

9. In apparatus as claimed in claim 8, wherein said actuating and indexing means functions to actuate the said first annular ring member to a position where it engages a continuously rotating drive means for selectively moving said ring member from one indexing seat to the next adjacent indexing seat to effect the sequential blanking operation of the sheet member.

10. In apparatus as claimed in claim 8, wherein said first annular ring member has cam elements and including a second fixed annular ring member spaced closely adjacent said first annular ring member having cam means formed therein and a third actuating ring member and means for reciprocating said third ring member to effect movement of said first annular ring member between successive indexing positions by interengagement of said cam elements and cam means.

* * * * *